United States Patent
Shimizu et al.

[11] Patent Number: 6,074,196
[45] Date of Patent: Jun. 13, 2000

[54] FRESNEL LENS MANUFACTURING APPARATUS

[75] Inventors: Mitsuru Shimizu; Yoshihiro Fujita, both of Saitama, Japan

[73] Assignee: Fuji Photo Film Co., Ltd., Kanagawa, Japan

[21] Appl. No.: 09/138,524

[22] Filed: Aug. 24, 1998

Related U.S. Application Data

[60] Division of application No. 08/699,639, Aug. 19, 1996, Pat. No. 5,840,352, which is a continuation-in-part of application No. 08/297,962, Aug. 30, 1994, abandoned.

[30] Foreign Application Priority Data

| Sep. 6, 1993 | [JP] | Japan | 5-221395 |
| Mar. 1, 1994 | [JP] | Japan | 6-31485 |
| Aug. 18, 1995 | [JP] | Japan | 7-210357 |

[51] Int. Cl.⁷ ................................................. B29C 45/40
[52] U.S. Cl. ........................................ 425/556; 264/334
[58] Field of Search ........................... 425/556; 264/334

[56] References Cited

U.S. PATENT DOCUMENTS

| 3,952,991 | 4/1976 | Schneider. |
| 4,653,997 | 3/1987 | Sheffield et al. ............... 425/556 |

FOREIGN PATENT DOCUMENTS

4-69217  3/1992  Japan.

*Primary Examiner*—Tim Heitbrink
*Attorney, Agent, or Firm*—Young & Thomposn

[57] ABSTRACT

An apparatus for producing a Fresnel plate has a mold assembly comprising movable and stationary molds coupled with each other. The mold assembly includes a Fresnel forming face formed on the inside of the movable mold. Melted resin is injected into the mold assembly for forming the Fresnel plate. At least one movable slit is formed through, and arranged inside, the movable mold along a circle concentric with the Fresnel plate and in intermittent or continuous fashion. The movable slit is used for blowing compressed air toward the Fresnel plate. The slit closely surrounds the center of the Fresnel plate. Ejector pins surround the Fresnel plate outside its Fresnel forming face.

11 Claims, 12 Drawing Sheets

FRESNEL LENS MANUFACTURING APPARATUS

CROSS-REFERENCE TO RELATED APPLICATION

The present application is a division of application Ser. No. 08/699,639, filed Aug. 19, 1996, now U.S. Pat. No. 5,840,352, which is a continuation-in-part of application Ser. No. 08/297,962, filed Aug. 30, 1994, now abandoned.

BACKGROUND OF THE INVENTION

1. Field of the Invention

The present invention relates to an apparatus for manufacturing a Fresnel lens. More particularly, the present invention relates to a Fresnel lens manufacturing apparatus in which a Fresnel lens having high quality can be molded with great ease.

2. Description Related to the Prior Art

A Fresnel lens is characterized in that its thickness is small. A virtual concave or convex lens, having curved faces, is split with reference to a great number of minute sections. The curved faces as split into the plural sections are arranged on a plane surface to define the Fresnel lens, which is optically equivalent to the original concave or convex lens virtually plotted. The Fresnel lens is also understood as a combination of a plurality of minute lens elements which are different in direction of refraction. The Fresnel lens has an advantage in that its thickness and weight is smaller than an equivalent concave or convex lens, and in that it can be manufactured easily in mass production by injection molding. The Fresnel lens is generally used as a plate for condensing light projected from a light source. One of the two faces of the Fresnel lens can be provided with a deposit of reflective material, to obtain a Fresnel mirror, which is generally used in an overhead projector as a reflector placed on a stage for supporting a transparent original.

The produce such a Fresnel lens, plastic material is molded by injection molding. An assembly of molds having a Fresnel forming face is used. The Fresnel lens must be released from the mold assembly before the injection molding of the Fresnel lens can be terminated. For the purpose of releasing the Fresnel lens in better condition, it is proposed in JP-A (Japanese Patent Laid-open Publication No.) 4-69217 that plural release pins are arranged through the mold assembly, and are adjusted to project toward the Fresnel lens progressively farther in directions away from the center of the Fresnel lens.

It is normal to form Fresnel plates by injection molding, compression forming, or casting. A coating of transparent protective membrane is applied to the Fresnel plate. A Fresnel mirror is produced by depositing a reflective membrane on the Fresnel plate and by applying the protective membrane thereto.

The Fresnel lens has minute ridges and grooves in the thinly formed plate formed by injection molding. The contact pressure between the mold assembly and the Fresnel leans is remarkably high. If only ejector pins are used for releasing or separating the Fresnel lens from the molds, such pins are required to press with great force on the Fresnel lens. Such release pins press only points on the Fresnel lens, namely at very small areas. The points receive excessive pressure from the pins, to such an extent as to bend the Fresnel lens, and damage its optical performance seriously. The pins are likely to tear the Fresnel lens. If the Fresnel lens is designed to have a large area, a much greater number of release pins must be arranged correspondingly. This makes it very difficult to construct an associated mold assembly.

After the forming of the Fresnel face of the plate the protective membrane is applied, and the reflective membrane is deposited. This requires steps additional to the forming of the Fresnel face, makes the manufacture more difficult and complex, and raises the cost of manufacture. In the Fresnel plate of a reflective type, in particular, it is very difficult to coat the deposited reflective membrane with the protective membrane at a regular thickness. This is a problem in degrading optical performance of condensing light, and lowering the durability of the protective membrane.

SUMMARY OF THE INVENTION

In view of the foregoing problems, an object of the present invention is to provide a fresnel lens manufacturing apparatus with which a Fresnel lens having high quality can be molded with great ease.

Another object of the present invention is to provide a Fresnel lens manufacturing apparatus capable of precisely forming a Fresnel face without accidental failure in molding.

In order to achieve the above and other objects and advantages of this invention, an apparatus for producing a Fresnel plate has a mold assembly comprising first and second molds coupled with each other. The mold assembly includes a Fresnel forming face formed on an inside of at least one of the first and second molds. Melted resin is injected into the mold assembly for forming the Fresnel plate by injection molding. At least one first slit is formed through the mold assembly and arranged inside the mold assembly along a circle concentric with the Fresnel plate and in intermittent or continuous fashion. The first slit is used for blowing compressed air toward the Fresnel plate. The Fresnel plate having high quality can be molded with great ease. The Fresnel lens can be provided with a Fresnel face without accidental failure in molding.

The first slit is located in association with a top or a bottom of projections defining a Fresnel face of the Fresnel plate. The first slit has a width between 0.002 mm and 0.1 mm.

In production of the Fresnel plate, compressed air is blown toward the Fresnel plate through a stationary slit directly before, or simultaneously with, opening the mold assembly after injecting the resin, wherein the stationary slit is formed through, and arranged inside, the stationary mold along a circle concentric with the Fresnel plate and in intermittent or continuous fashion. Compressed air is blown toward the Fresnel plate through a movable slit directly before an end of opening the mold assembly or directly before ejection of the Fresnel plate from the mold assembly, wherein the movable slit is formed through, and arranged inside, the movable mold along a circle concentric with the Fresnel plate. The Fresnel plate is separated from the mold assembly.

In a preferred embodiment, transfer film is previously inserted in the mold assembly. The transfer film includes a membrane, which is transferred when the transfer film is pressurized. The mold assembly containing the moldable material and the transfer film is pressurized. The transfer film is pressed against the moldable material, to transfer the membrane to the moldable material. The Fresnel plate is a Fresnel mirror, and the membrane has a reflective layer for reflecting light. The membrane can be applied to the plate material for the Fresnel plate in reliable an easy fashion.

In still another preferred embodiment, a Fresnel forming face is formed on either of the stationary and movable molds with reference to a reference plane, the Fresnel forming face including plural annular slope sections and plural annular rise sections, the annular slope sections and annular rise sections being arrange alternately and concentrically, the Fresnel forming face being adapted to form from resin a Fresnel plate. To produce the Fresnel plate, a first slit is formed in the Fresnel forming face, for applying compressed air to the Fresnel plate when the Fresnel plate is released. There is a first ridge line disposed between a first one of the plural slope sections and a first one of the plural rise sections adjacent to the first slope section, the Fresnel forming face projecting at the first ridge line. The first rise section is formed between the first ridge line and a first bottom line adjacent to the first ridge line, and is inclined in reverse to the first slope section. The first slope section and the first rise section satisfy the relationship:

$$0.1 \leq b/L1 \leq 0.9$$

wherein L1 satisfies the relationship:

$$L1 = P \cdot \sin \theta \cdot \tan$$

wherein θ is the angle defined between the first slope section and the reference plane;

P is the width of the first slope section in a direction along the reference plane; and b is the distance between the first intersecting point and the first ridge line, wherein the first intersecting point is defined by the intersection of an extension of the first slope section and a perpendicular surface passing through the first bottom line and perpendicular to the reference plane.

Preferably, the first slit has a width of 0.005–0.025 mm.

Also there is a second bottom line disposed between the second and third slope sections. The first slit has first and second walls, the second bottom line lying on the first wall. The second slope section and the first slit satisfy the relationship:

$$L2 \leq L3 + 0.01 \text{ mm}$$

wherein L3 satisfies the relationship:

$$L3 = P1 \cdot \sin \theta 1 \cdot \tan \theta 1$$

where in θ1 is the angle defined between the second slope section and the reference plane;

P1 is a width of the second slope in the direction along the reference plane; and L2 is a distance between a second intersecting point and the second wall, wherein the second intersecting point is defined by the intersection of an extension of the second slope section and a perpendicular surface passing through the second bottom line and perpendicular to the reference plane.

The Fresnel forming face satisfies the relationship:

$$0.2R \leq r \leq 0.8R$$

wherein R is the radius of the periphery of the Fresnel forming face with reference to the center of the Fresnel forming face; and r is a radius defined between a middle point inside the first slit and the center of the Fresnel forming face.

The inclination of one of the rise sections is steeper relative to the reference plane than the inclination of another of the rise sections nearer to the center of the Fresnel forming face than the one rise section.

BRIEF DESCRIPTION OF THE DRAWINGS

The above objects and advantages of the preset invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
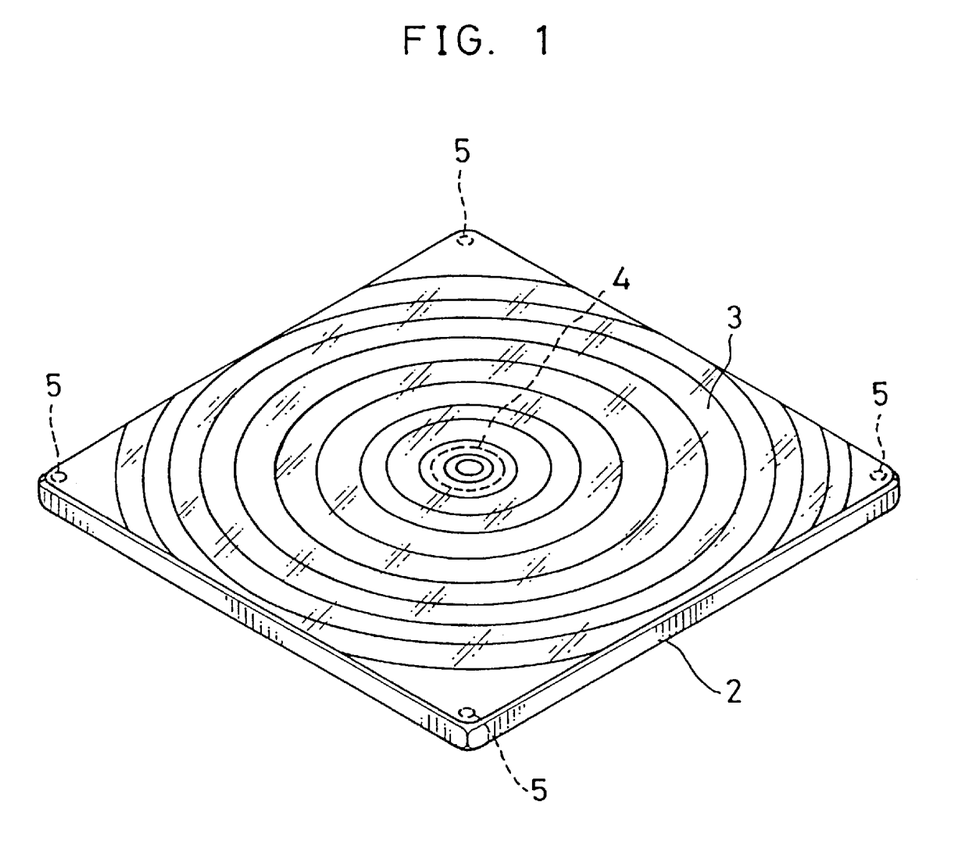
FIG. 1 is a perspective view illustrating a Fresnel lens manufactured in accordance with the present invention.

FIG. 1 illustrates a Fresnel plate 2 to be manufactured in accordance with the present invention. The Fresnel plate 2 is formed as one piece from the resin generally having high transparency, and is provided with a Fresnel face 3 consisting of a great number of minute annular ridges formed to be concentric. The bottom face of the Fresnel plate 2 is flat. The Fresnel plate 2 herein referred to is equivalent to a concave lens, and has a thickness as small as several millimeters.

A peeling position 4 defined as a circle by the broken line corresponds to a circular slit formed in the inside of a mold to be mentioned later, and subjected to the compressed air applied to the Fresnel plate 2 for peeling from the mold. Four circular points 5 of contact indicate positions for contact with the ejector pins disposed inside the mold for peeling the Fresnel plate 2.

Figure 2:
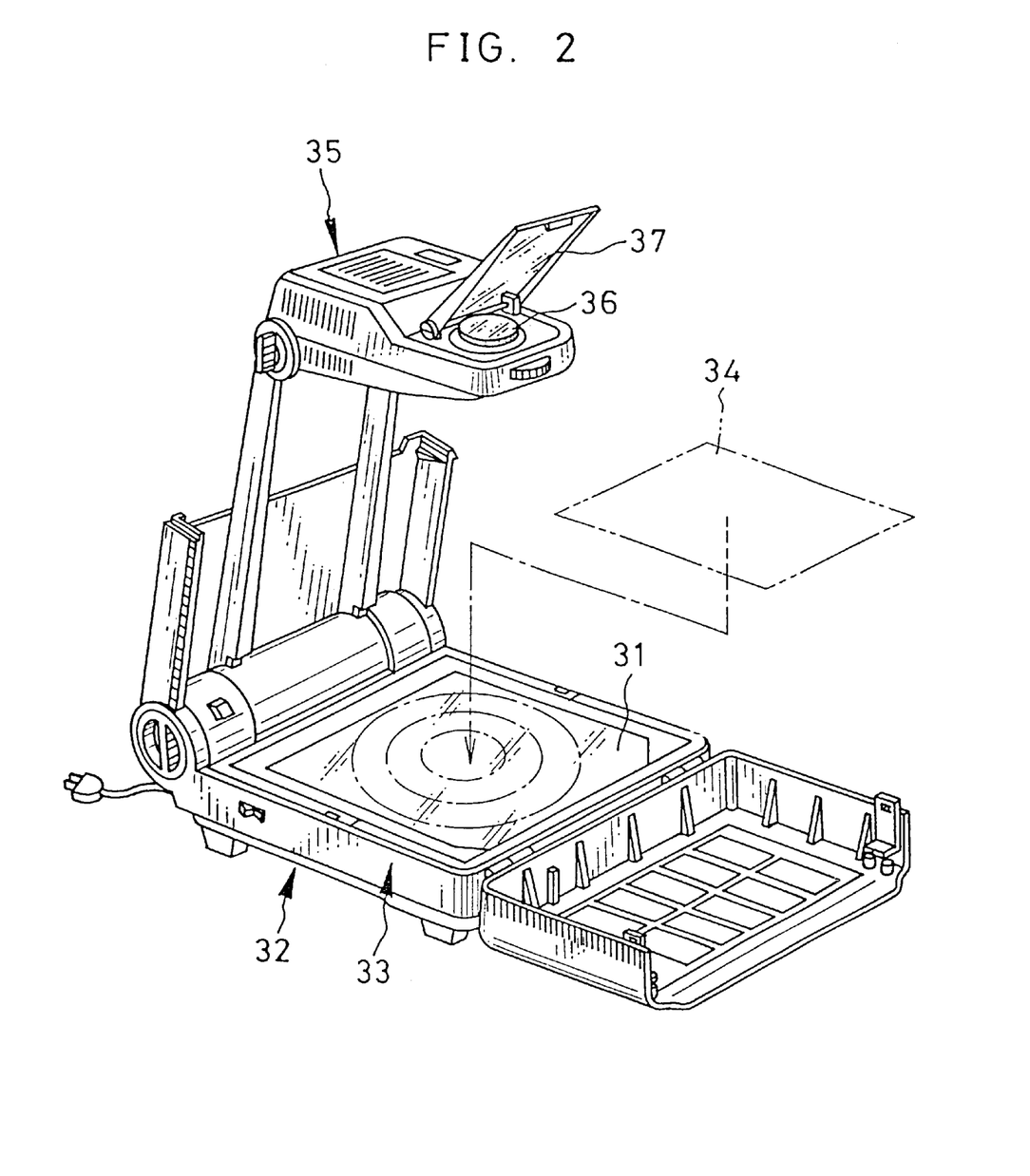
FIG. 2 is a perspective view illustrating an overhead projector in use with a Fresnel plate according to the present invention.

FIG. 2 illustrates a reflecting type of an overhead projector 32 in which the Fresnel plate according to the present invention is used. The Fresnel plate is provided with metallic deposit formed on its Fresnel face, and becomes a Fresnel mirror 31, which is placed on a stage 33 in the overhead projector 32. On the Fresnel mirror 31, an original 34 is placed. The original 34 consists of a transparent sheet with which an image is recorded. When a lamp incorporated in a projecting head 35 is actuated, the illuminating light from the lamp is transmitted through the original 34, and reflected by the Fresnel mirror 31. The Fresnel mirror 31 equivalent to a concave mirror condenses the light. The original 34 is illuminated from its rear effectively and its image is projected by a projecting lens 36 and diverted by a mirror 37 to a screen (not shown).

Figure 3:
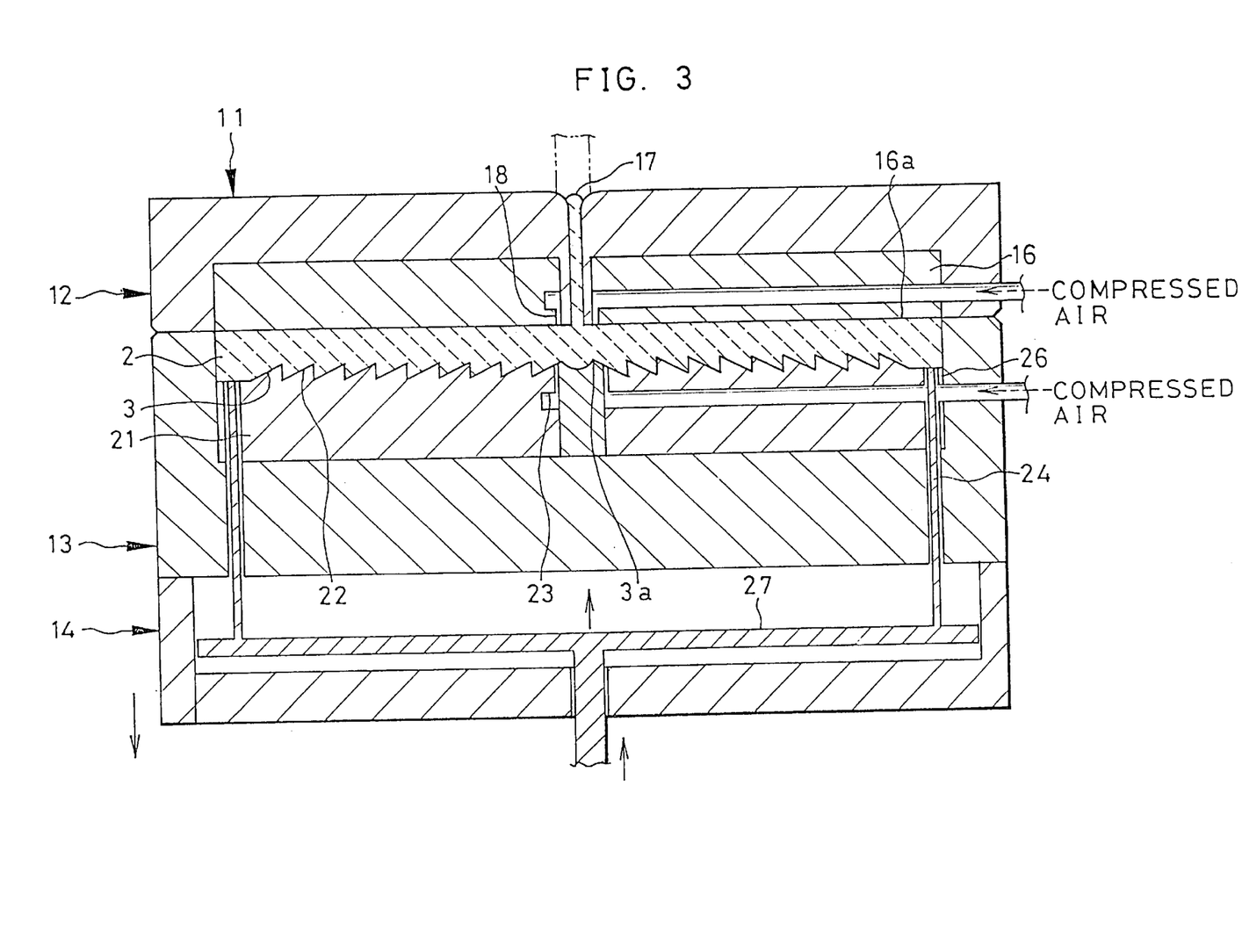
FIG. 3 is a cross section illustrating a mold assembly of an apparatus for manufacturing the Fresnel lens of FIG. 1.

FIG. 3 illustrates in cross section a mold assembly 11 of the manufacturing apparatus. The mold assembly 11 consists of a stationary mold holder 12, a movable mold holder 13 and a releasing mechanism 14. Inside the stationary molder holder 12, a stationary mold 16 is fixed. The stationary mold 16 has a regularly flat molding face 16a, for molding the flat bottom of the Fresnel plate 2.

In the center of the stationary mold 16, a gate 17 is formed for passing liquid resin which is transparent and melted for forming the Fresnel plate 2. The gate 17 is connected to a liquid resin supply device (not shown), which supplies the gate 17 continuous with the transparent resin melted at a high temperature. Near to the gate 17, there is formed an annular slit 18 connected to a compressor (not shown) for blowing the compressed air. The slit 18 is formed to have a width between 0.002 mm and 0.1 mm, so small that the high viscosity of the melted resin can prevent the resin from entering the slit 18 during the supply of the resin.

The movable mold holder 13 has a movable mold 21 fitted thereon. The movable mold 21 has a great number of minute annular grooves 22 formed as a Fresnel forming face, which is used for molding the Fresnel face 3 of the Fresnel plate 2. The center of the movable mold 21 has also an annular slit 23 connected to a compressor (not shown) for blowing the compressed air. The annular slit 23 is located in correspondence with a retracted position 3a of the Fresnel face 3. The annular slit 23 has also the width between 0.002 mm and 0.1 mm. The melted resin is thereby prevented from entering the slit 23.

In ends of the movable mold 21, holes 26 are formed, and receive ejector pins 24. To separate the Fresnel plate 2 from the mold 21, the ejector pins 24 are projected toward the Fresnel plate 2. The releasing mechanism 14 has an ejector plate 27 slidable up and down inside the housing of mechanism 14. The ejector pins 24 are fixed on the ejector plate 27, extend through the holes 26 and to the inside face of the movable mold 21. The bottom of the ejector plate 27 is linked to a reciprocating mechanism (not shown), which moves the ejector plate 27 upward to project the ejector pins 24 up.

Figure 4:
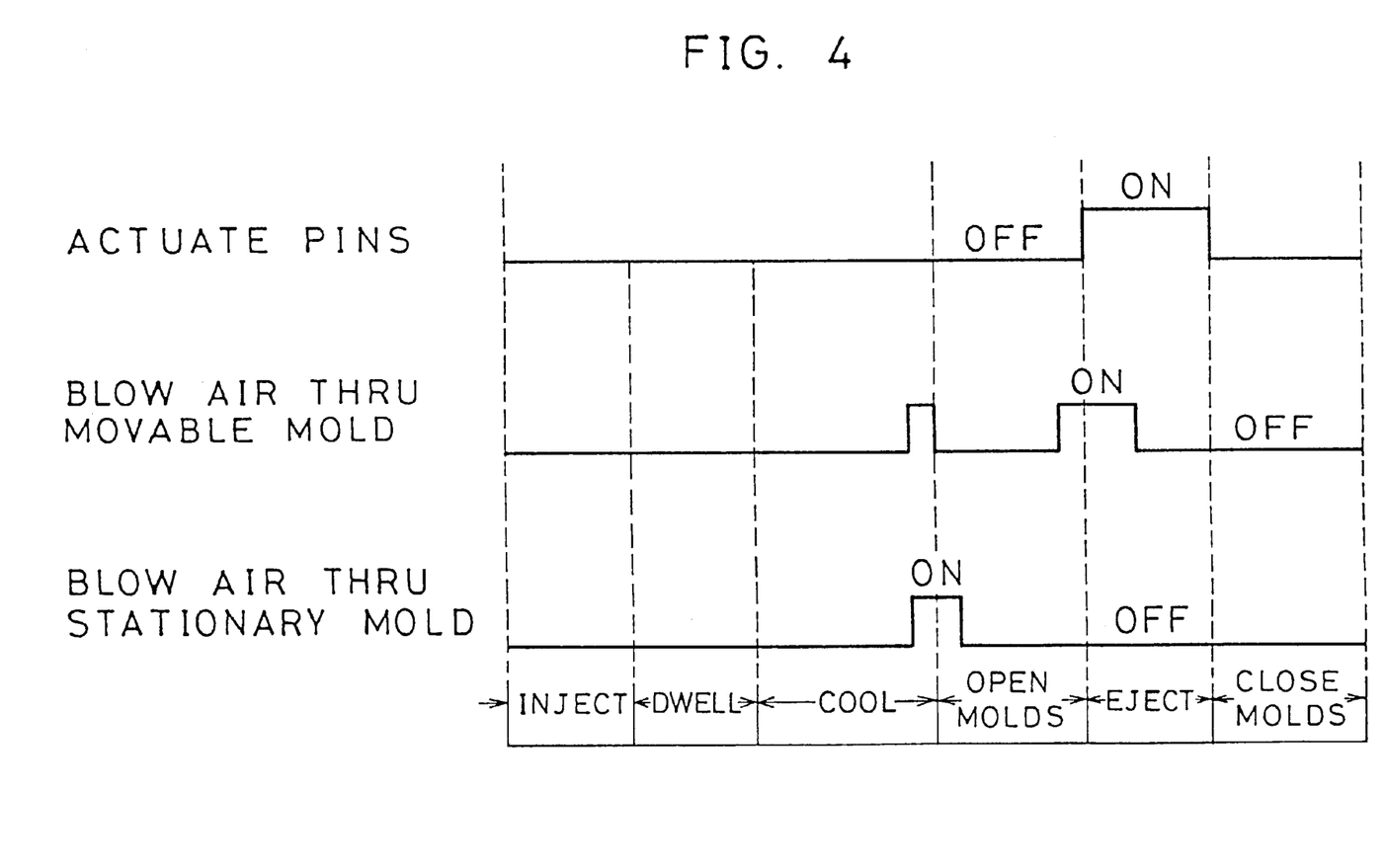
FIG. 4 is an explanatory view illustrating operation of a releasing mechanism of the mold assembly.

The operation of the present invention is described now. FIG. 4 illustrates a cycle of operating a mechanism for releasing the Fresnel plate from the mold assembly 11. In producing the Fresnel plate 2 according to the injection molding, the movable holder 12 in firm contact therewith. Then the melted transparent resin is poured through the gate 17 into a cavity defined between the stationary mold 16 and the movable mold 21. The gate 17 is located at the center of the stationary mold 16, so that it is possible to fill the resin between the molds 16 and 21, without leaving the periphery of the cavity for the Fresnel plate 2. The resin is injected at a high pressure of sufficiently filling the mold assembly 11 therewith. Each width of the annular slit 18 and 23 is as small as 0.002 to 0.1 mm, so that no resin enters or stops up the slits 18 and 23.

After the injection of the resin, the resin is cooled in the mold assembly 11 for a predetermined time. Then the solidified Fresnel plate 2 is taken out of the mold assembly 11. At first, an electromagnetic valve, connected to a compressor associated with the stationary mold holder 12, is actuated. Compressed air is applied toward the Fresnel plate 2 through the annular slit 18 in the stationary mold 16, which is referred to as "air blow through the stationary mold". The movable mold holder 13 is moved with the releasing mechanism 14 downward. The blown air separates the flat bottom of the Fresnel plate 2 from the stationary mold 16, and allows the Fresnel plate 2 to move down with the movable mold holder 13.

With the movable mold holder 13 separated from the stationary mold holder 12, an electromagnetic valve associated with the compressor is actuated, to blow the compressed air through the annular slit 23 in the movable mold 21 toward the Fresnel plate 2, which is referred to as "air blow through the movable mold". There occurs an air layer between the Fresnel face 3 on the Fresnel plate 2 and the Fresnel forming face on the movable mold 21. It follows that the Fresnel plate 2 is easily separated from the movable mold holder 13 without being bent seriously or damaged.

At the same time as blowing the air through the movable mold 21, the ejector plate 27 moves up, and projects the ejector pins 24 through the holes 26 in the movable mold 21 toward the Fresnel plate 2. This helps release the Fresnel plate 2 easily from the movable mold 21, and moves its Fresnel face away from the movable mold 21, to facilitate ejecting the Fresnel plate 2. The ejector pins 24 press the positions outside the Fresnel face on the Fresnel plate 2 when ejecting the Fresnel plate 2. Thus the Fresnel face is protected from being damaged by the ejector pins 24.

Both faces of the Fresnel plate 2 are raised by the compressed air away from the molds 16 and 21. No significant impact is applied to the Fresnel plate 2 while it is completely separated from the mold assembly 11. There occurs no flexure or damage to the lens faces.

The Fresnel mirror 31, produced from the Fresnel plate 2, has good precision with greater flatness. With the original 34 placed on the overhead projector 32, an image recorded on the original 34 is reflected to the projecting lens 36 without irregularity or degradation. The image on the original 34 is clearly projected onto the screen (not shown) through the projecting leans 36 and a projecting mirror 37.

Figure 3A:
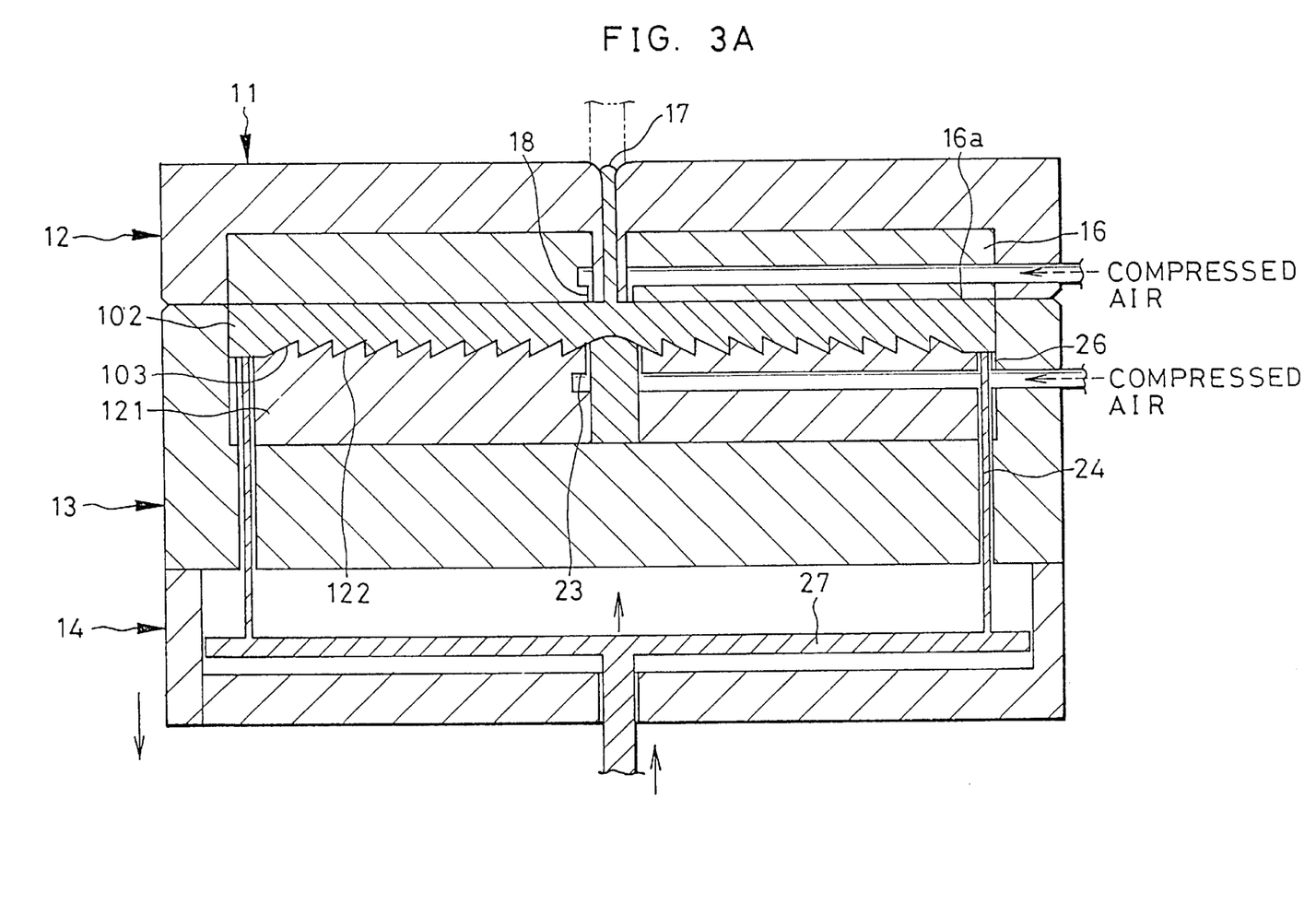
FIG. 3A is a cross section illustrating another preferred mold assembly for manufacturing a different Fresnel lens.

FIG. 3A illustrates another preferred Fresnel plate 102 and a relevant mold assembly. Although the former Fresnel plate 2 has the Fresnel face 3 of which the annular ridges have convex surfaces, the present Fresnel plate 102 has a Fresnel face 103 of which annular ridges have concave surfaces. The Fresnel face 103 is coated with a metallic deposit to be used as Fresnel mirror 31. There is no problem of a trace caused by the gate 17 on the bottom of the Fresnel plate 102. Referenced by 121 is a movable mold. Referenced by 122 is a Fresnel forming face which consists of annular grooves.

In the above embodiment, the openings for blowing the compressed air for release are slits formed in a continuous circle. Alternative openings can be a plurality of separate slits arranged in the shape of a single circle, or a plurality of separate holes arranged likewise.

In the above embodiment, the compressed air is blown through the movable slit 23 only once. It is further preferable, as illustrated in FIG. 4, to preliminarily blow the compressed air toward the Fresnel plate 2 or 102 through the movable slit 23 substantially simultaneously with the blowing of the compressed air through the stationary slit 18.

Figure 5:
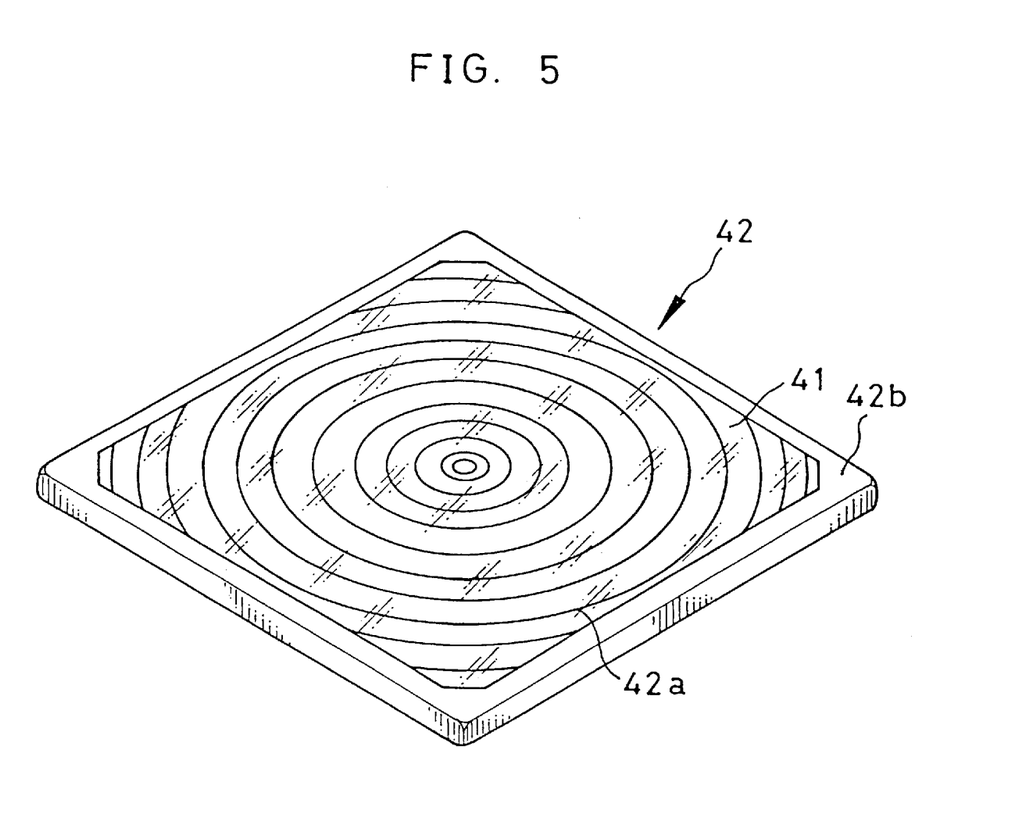
FIG. 5 is a perspective view illustrating another preferred Fresnel plate to which a reflective layer is applied.

FIG. 5 illustrates a Fresnel mirror 42 as a reflective type of a Fresnel plate, to which a reflective membrane is applied with ease. The Fresnel mirror 42 includes a plate material 42c, which is one piece of a resin having high transparency, and has a Fresnel face consisting of minute annular ridges formed to be concentric. The bottom face of the plate material 42c is flat. The plate material 42c is equivalent to a concave lens, an has a thickness as small as several millimeters.

Figure 6:
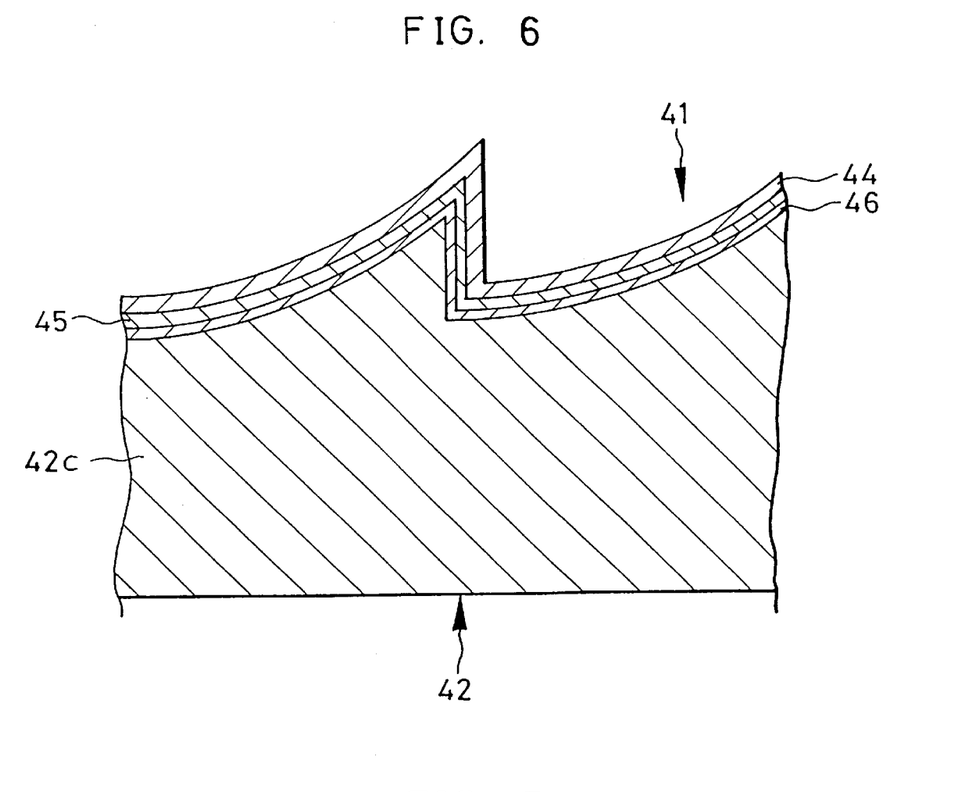
FIG. 6 is a cross section, in enlargement, illustrating a portion of the Fresnel plate of the FIG. 5.

The plate material 42c has a Fresnel face 42a, which is coated with a transferred membrane 41. The membrane 41 has a layered structure, which consists of a protective layer 44, an aluminum reflective layer 45, and an adhesive layer 46, arranged in that order toward a plate material 42c of the Fresnel mirror 42. The protective layer 44 is a transparent plastic layer for protecting the reflective layer 45. The reflective layer 45 consist of an aluminum deposit, an aluminum sputtered membrane, or a thin aluminum sheet finished to have gloss. The adhesive layer 46 consists of an adhesive agent for adhering the reflective layer 45 to the Fresnel face 42a.

Figure 7:
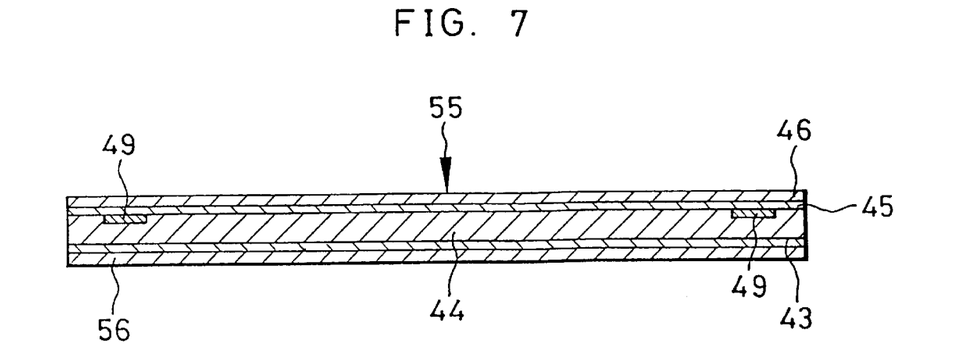
FIG. 7 is a cross section illustrating transfer film used for the Fresnel plate.
Figure 8:
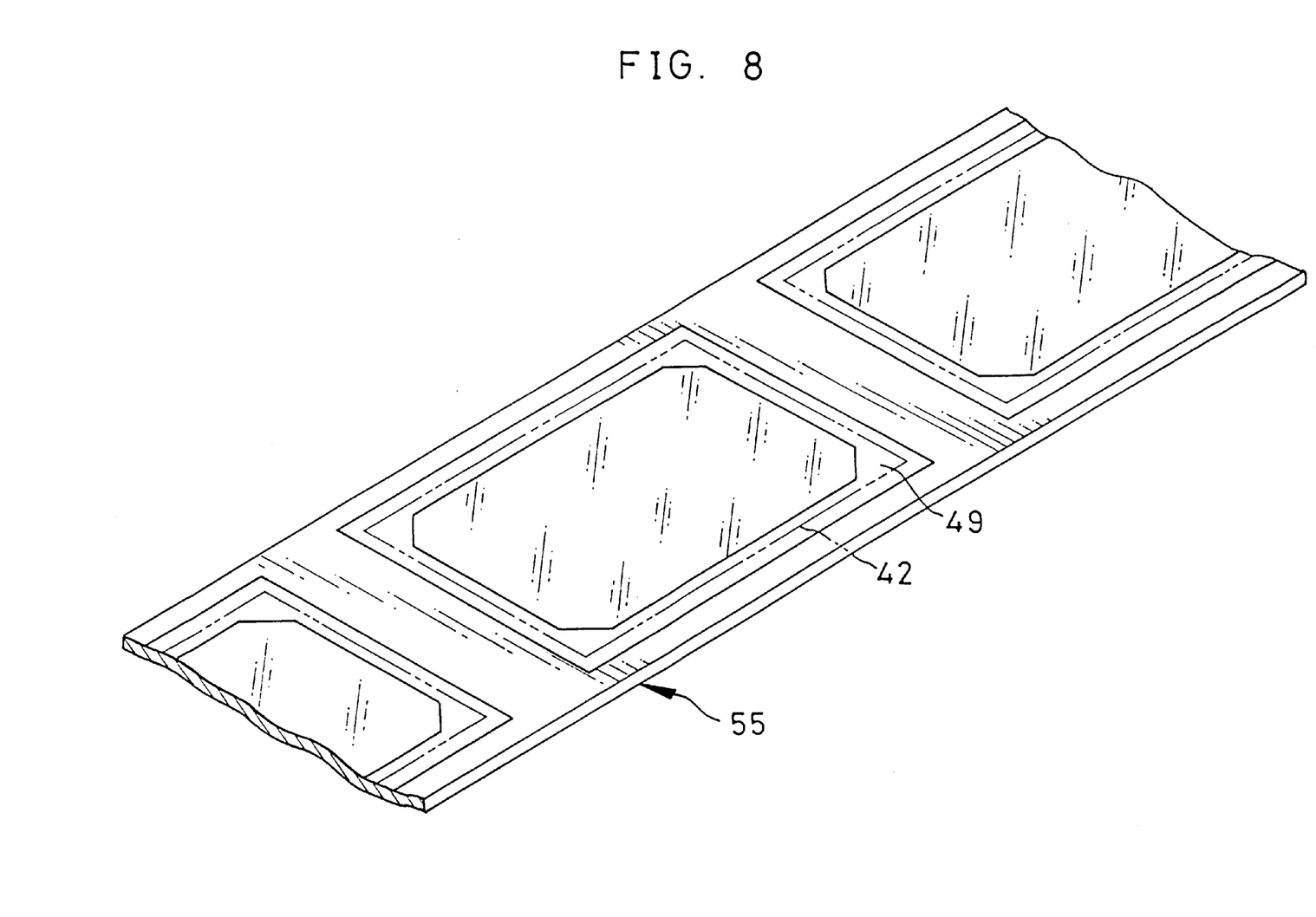
FIG. 8 is a perspective view illustrating the transfer film.

FIG. 7 illustrates, in enlargement, a transfer film 55 used for manufacturing the Fresnel mirror, with FIG. 8 illustrating a portion of the continuous transfer film. The transfer film 55 has base film or support 56 of resin having high resistance to tearing. The release layer 43, the protective layer 44, the reflective layer 45, and the adhesive layer 46 are formed on the support 56 and in an area of the Fresnel face 42a of the Fresnel mirror 42. Furthermore, the transfer film 55 is provided with a reflective preventing layer 49 located in association with marginal areas 42b of the Fresnel mirror 42, for the purpose of avoiding reflection of incident light. The release layer 43 is formed for facilitating separation of a stationary mold 54 and the transfer membrane 41.

Figure 9A:
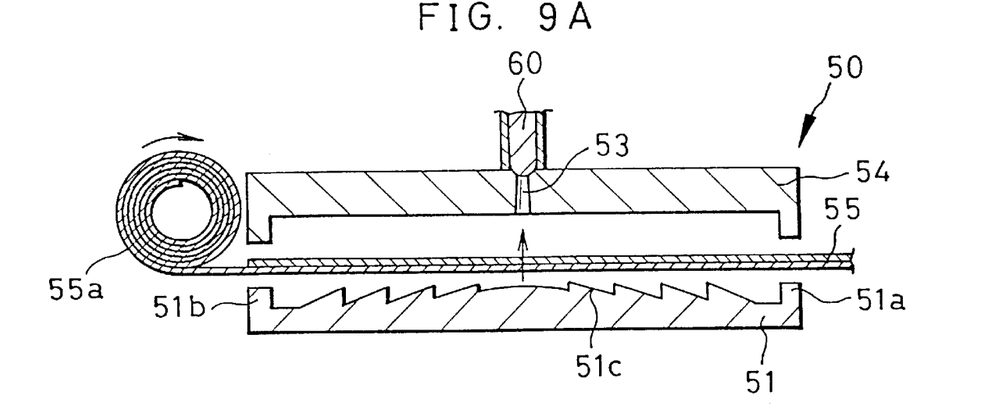
FIG. 9A to 9C are explanatory views illustrating steps of manufacturing the Fresnel plate.
Figure 9B:
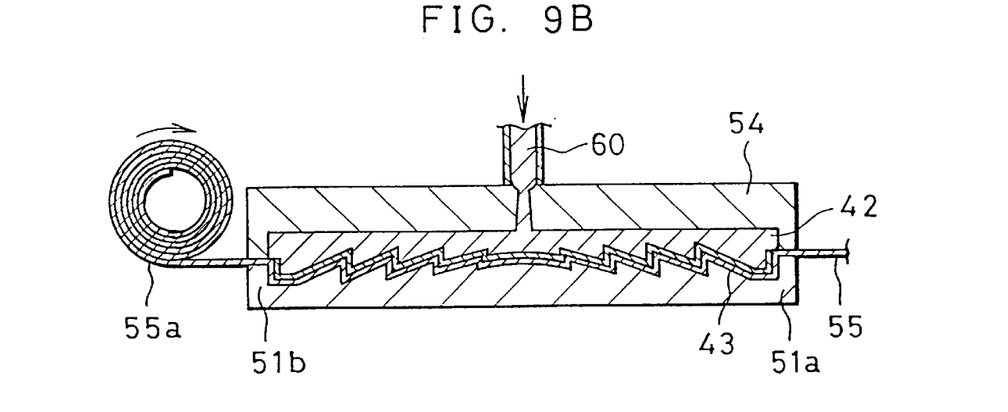
Figure 9C:
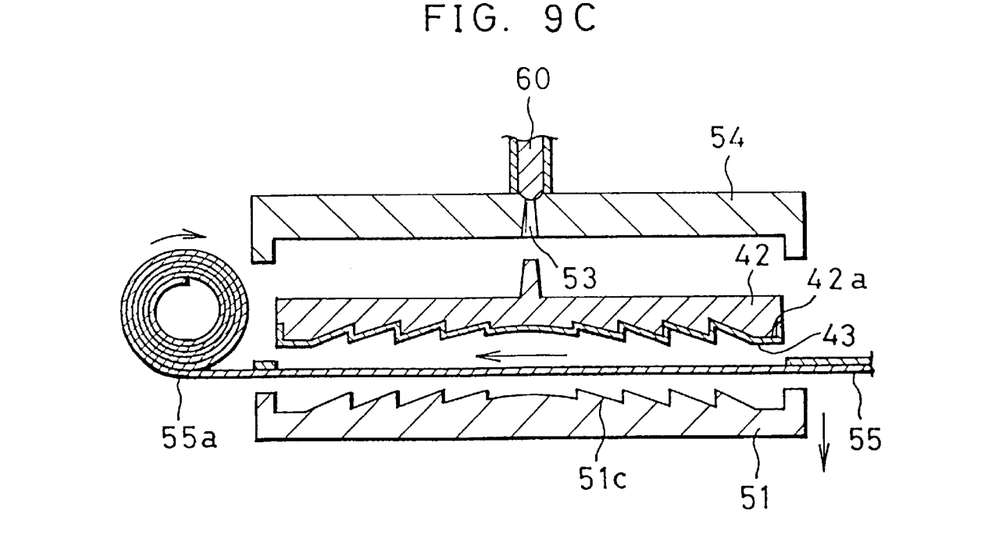

FIGS. 9A and 9C illustrate the steps of producing the Fresnel mirror 42. A mold assembly 50 consists of a movable mold 51 and a stationary mold 54. For injection molding, the movable mold 51 is raised toward the stationary mold 54 by a jack-up mechanism (not shown), to press mold ends 51a and 51b against the stationary mold 54. The movable mold 51 has minute annular grooves 51c formed as a Fresnel forming face.

The stationary mold 54 has a gate 53 for passing liquid resin forming the Fresnel plate 42. The gate 53 is connected to a liquid resin supply device (not shown).

Between the movable and stationary molds 51 and 54, the transfer film 55 is consecutively supplied and positioned. After the membrane 41 is transferred to the plate material 42c, the donor film 55a of the transfer film 55 is wound up as a roll.

The operation of the present embodiment is described now. To produce the Fresnel plate 42 by injection molding, the transfer film 55 is set as illustrated in FIG. 9A between the movable mold 51 and the stationary mold 54. The transfer film 55 is held exactly so as to position the membrane 41 on the Fresnel face 42a of the Fresnel plate 42, and position the reflection protective layer 49 in the marginal areas 42b with accuracy.

Then the movable mold 51 is raised as illustrated in FIG. 9B, to press the mold ends 51a and 51b against the stationary mold 54. The transfer film 55 is retained in a predetermined position between the movable and stationary molds 51 and 54. The resin 60 is injected through the gate 53, ad is filled within the cavity between the molds 51 and 54. The pressure of injection of the resin 60 presses the transfer film 55 in the mold assembly 50 against the annular grooves 51c in the movable mold 51.

The heat of the melted resin 60 is applied to the transfer film 55, and transfers the membrane 41 to the Fresnel face 42a. A predetermined length of time elapses. The resin 60 is hardened. As illustrated in FIG. 9C, the movable mold 51 is lowered. The donor film 55a is peeled off from the plate material 42c after the transfer of the membrane 41. The donor film 55a consists of the support 56, from which the membrane 41 is cut away in a position near the reflection protective layer 49. Then the Fresnel mirror 42 is separated from the stationary mold 54, and can be now used as a product of the reflecting type.

The donor film 55a is further wound up, to set a new portion of the transfer film 55 in the station between the molds 51 and 54. A similar process is repeated, to produce another Fresnel mirror successively.

In the above embodiment, the steps of producing the Fresnel mirror as a reflecting type of a Fresnel plate are described. The resin for the plate material is transparent. However, opaque resin may be used for forming the plate material, which can be provided with the reflective layer to form a Fresnel mirror. The present invention is applicable to a method of forming a protective layer on a Fresnel plate without a reflective layer, by using a transfer film desired for the purpose. A Fresnel plate may be of a light-transmitting type, as a Fresnel lens. In the above, injection molding is used. Alternatively air-pressure forming, compression forming, or other forming methods can be used.

In general, the firmness of contact of the Fresnel lens and the molds is remarkably great, because the Fresnel lens has a great number of minute grooves and ridges, or recesses and projections. In the manufacturing apparatus of the above-mentioned Japanese Laid-open Publication No. 4-69217, the molded project must be pushed with considerable force by the ejector pins before it can be released. The annular lens portions collectively constituting the Fresnel lens have drop sections, which are respectively defined between two adjacent annular lens portions, and are perpendicular to a reference plane. The direction of the drop sections is the same as that of the releasing of the Fresnel lens. Considerable friction occurs between the drop sections and the molds, and impedes the mold releasing operation. The manufacturing apparatus of the prior art document has ejector pins by which are pressing force is concentrated at their tips. The Fresnel lens must receive irregular pressure, may become curved or deformed, may have no optical characteristic as expected, and also may be destroyed.

Figure 10:
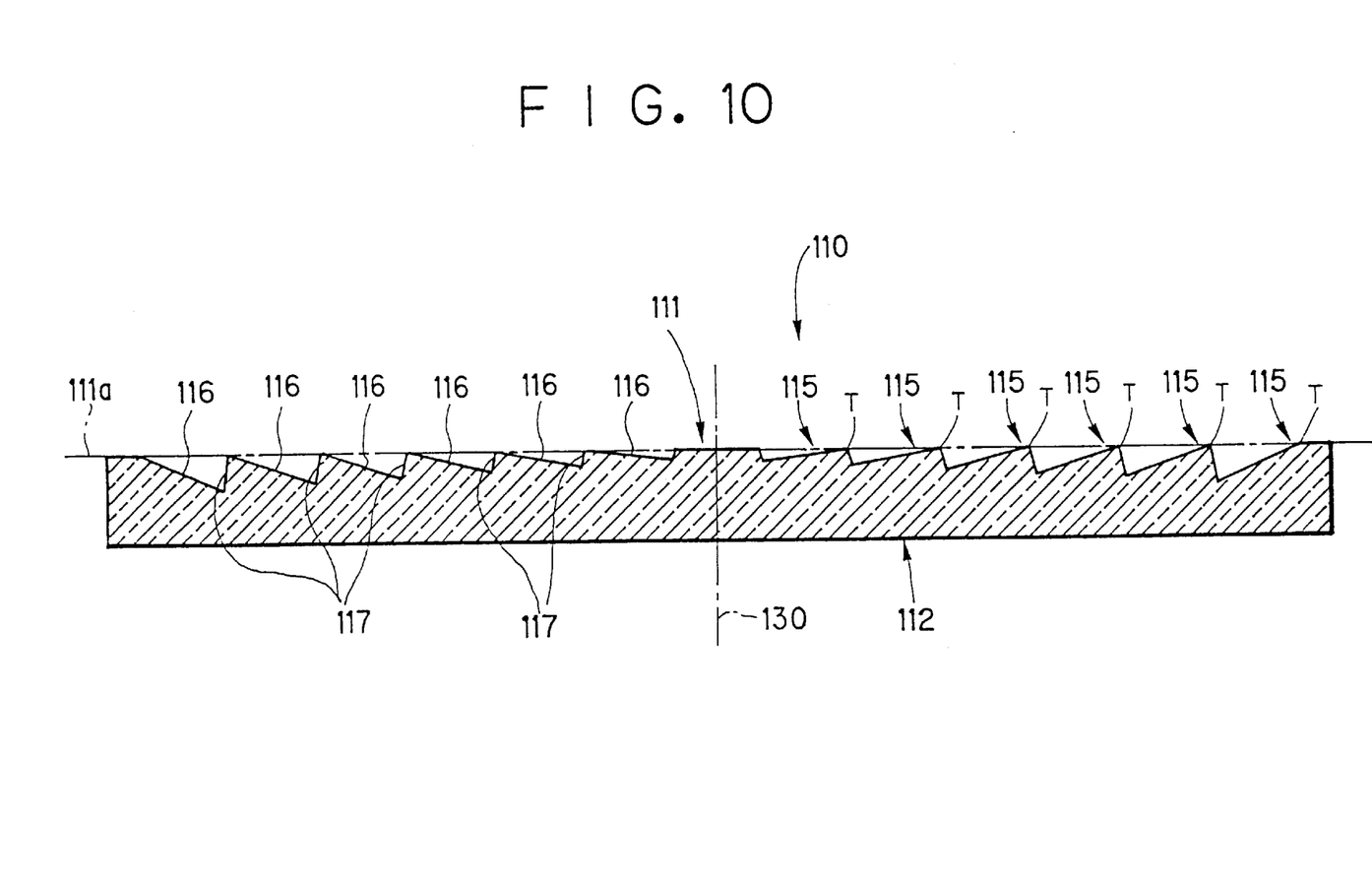
FIG. 10 is an explanatory view illustrating a Fresnel lens manufactured according to another preferred manufacturing apparatus.

A Fresnel lens manufacturing apparatus is described now. In FIG. 10, a Fresnel lens 110 has a Fresnel surface 111 as an obverse, and a flat reverse surface 112, and is formed from transparent resin having high transparency. The Fresnel surface 111 includes a great number of minutely formed annular lens portions 115 arranged in a concentric manner. The annular lens portions 115 have slope sections 116 inclined to obtain an optically refractive characteristic, and drop sections 117, each of which is formed between a ridge line T and a bottom line of two adjacent slope sections 116. The ridge line T is disposed to lie on a reference plane 11a.

Figure 11:
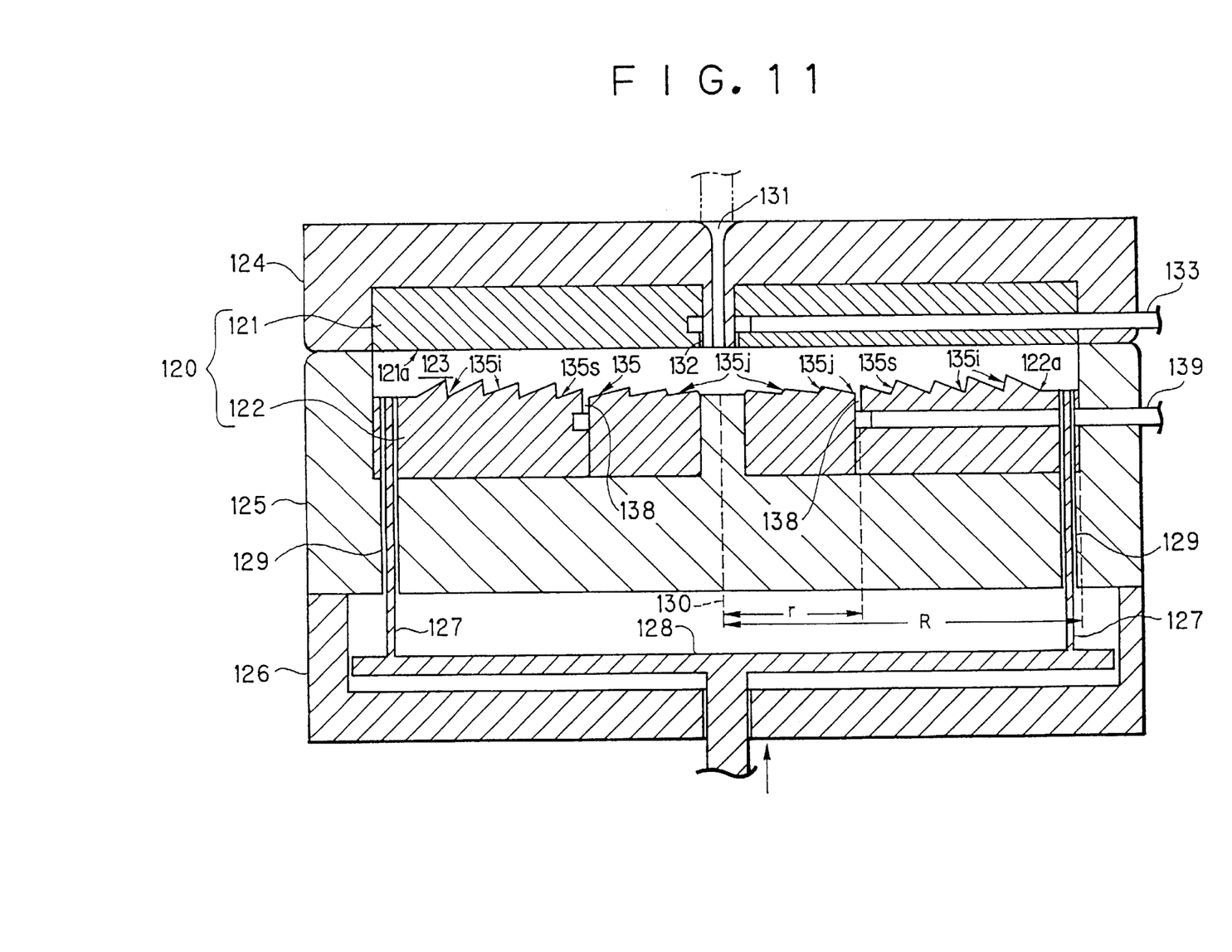
FIG. 11 is a cross section illustrating the Fresnel lens manufacturing apparatus.

In FIG. 11, a mold assembly 120 includes a stationary mold 121 and a movable mold 122, between which a gap 123 is defined in a shape similar to the Fresnel lens 110. The stationary mold 12 is fitted on a movable mold support 125. The movable mold support 125 is movable up and down in the vertical direction. The movable mold 122 can be moved toward and away from the stationary mold 121 by the movable mold support 125. There is a mold release mechanism 126 under the movable mold support 125. The mold release mechanism 126 includes an ejector plate 128 slidable up and down, and ejector pins 127 fixedly disposed to project from the ejector plate 128. When the ejector plate 128 is slid up, the ejector pins 127 move up into the gap 123 through holes 129, which are formed through the movable mold 122 and the movable mold support 125.

A forming face 121a of the stationary mold 121 is uniformly flat to form the flat surface 112 of the Fresnel lens 110. There is a gate 131 formed through the center of the stationary mold 121 and the stationary mold support 124 for injection hot molten liquid resin into the gap 123 in the mold assembly 120. An annular slit 132 is formed near to the periphery of the gate 131. An air passageway 133 communicates with the annular slit 132, and is formed through the stationary mold 121 and the stationary mold support 124. Compressed air is passed through the air passageway 133, and flows into the gap 123.

Figure 12:
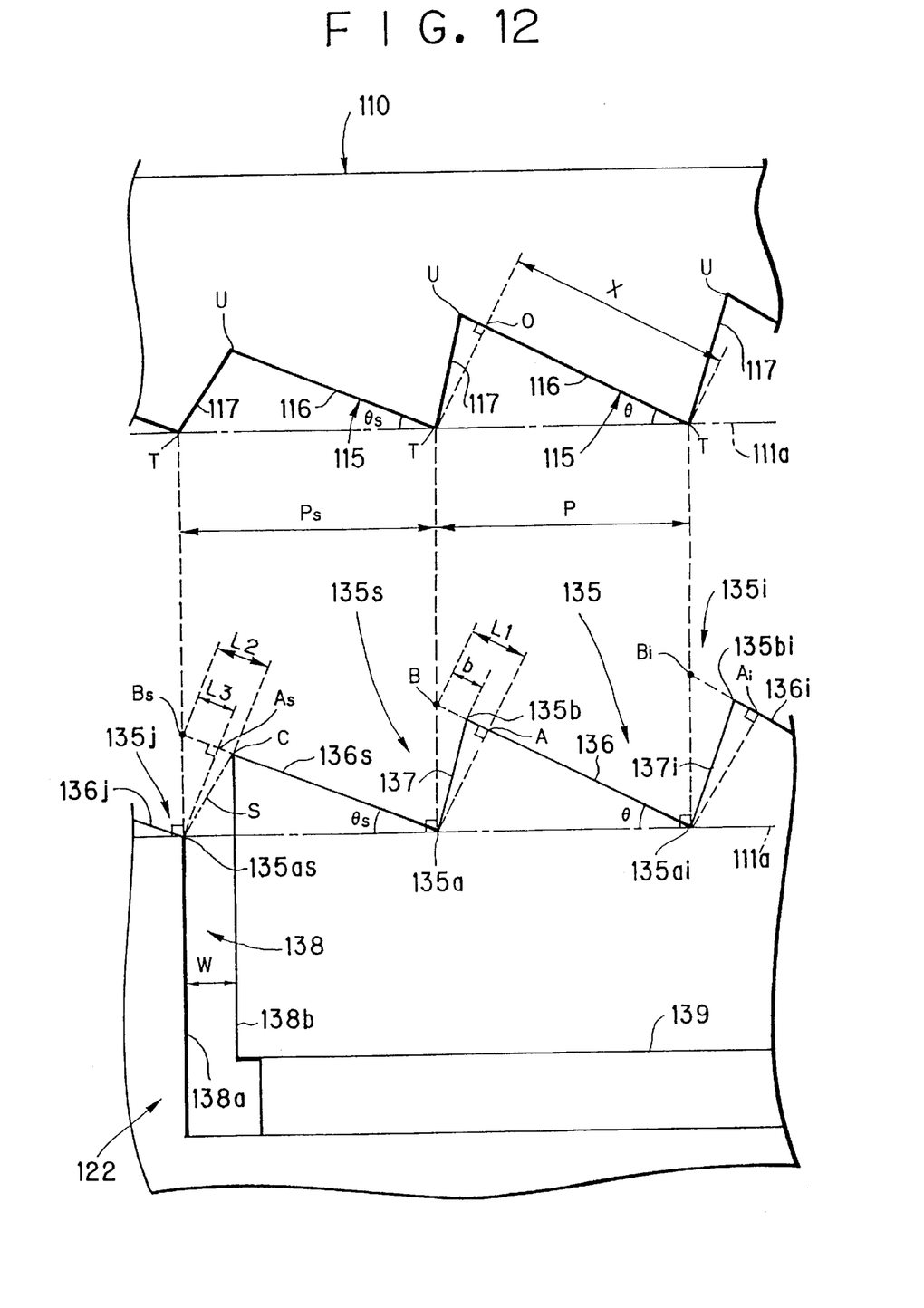
FIG. 12 is an explanatory view in section, illustrating the relationship between a Fresnel forming face and the Fresnel lens.

The movable mold 122 as a Fresnel forming face 122a, which includes a number of partial mold portions 135, 135i, 135j, 135s of concentric annular shapes adapted to for the Fresnel surface 111 of the Fresnel lens 110. In FIG. 12, the partial mold portions 135, 135i, 135j, 135s respectively have slope sections 136, 137i, 136j, 137s and rise sections 137, 137i, 137j, 137s. The slope sections 136, 137i, 136j, 137s are inclined to match the slope sections 116 of the annular lens portions 115. The rise sections 137, 137i, 137j, 137s are adapted to form the drop sections 117. The movable mold 122 has a slit 138 and an air passageway 139. The air passageway 139 is used for the supply of compressed air. The annular slit 138 is connected to the air passageway 139, and used to supply the compressed air into the gap 123. The annular slit 138 has a circular shape concentric with the partial mold portions 135, 135i. The annular slit 138 is formed by eliminating one of the rise sections at the partial mold portion 135s. The annular slit 138 has a first wall 138a and a second wall 138b disposed about the first wall 138. The first wall 138a is located so that a bottom line 135as lies on the first wall 138a. The second wall 138b is located under the slope section 136s of the partial mold portion 135s.

The width W of the annular slits 132 and 138 formed in the stationary and movable molds 121 and 122 is preferably 0.005–0.025 mm. Should the width W be smaller than 0.005 mm, it would be difficult to form the annular slits 132 and 138 uniformly in the stationary and movable molds 121 and 122. Should the width W be greater than 0.025 mm, the resin would flow into the annular slits 132 and 138, to create portions with burr or flash on the Fresnel lens 110 when formed.

In FIG. 11, let R be a radius of a periphery of the Fresnel forming face 122a with reference to a center 130 of the Fresnel forming face 122a. Let r be a radius defined between a middle point inside the annular slit 138 and the center 130 of the Fresnel forming face 122a. It is preferable that the Fresnel forming face 122a satisfy the relationship:

$$0.2R \leq r \leq 0.8R$$

Should the radius r be smaller than 0.2 R, the annular slit 138 would be too near to the center 130 of the Fresnel lens 110. The force of the compressed air would fail to spread to the periphery of the Fresnel lens 110. Should the radius r be greater than 0.8 R, the annular slit 138 would be too near to the periphery of the Fresnel lens 110. The compressed air would escape externally through a small gap between the stationary mold 121 and the movable mold 122, so that the Fresnel lens 110 would be pressed with a lesser force.

In FIG. 12, the rise sections 137, 137i of the partial mold portions 135, 135ai, and the inclination opposite to the slope sections 136, 136i, not vertically. The inclination of the rise sections 137, 137i is increased gradually toward the periphery of the Fresnel surface 111 from its center 130.

In FIG. 12, the annular lens portions 115 have tops T and bottoms U between them. A line is drawn to pass through each of the tops T and perpendicularly to one of the slope sections 116, to define a foot at a point O on the one of the slope sections 116. A light passing range of the observing light through the slope sections 116 of the annular lens portions 115 is determined as a range X, which is defined between the points O and T. If the bottom U lies in the light passing range X, there is a problem of appearance of the bottom U in the observing light. It follows that the annular lens portions 115 should have the bottoms of the U out of the light passing range X.

Let a point A be a foot of a line perpendicular to the slope section 136 and passing the bottom line 135a. Let a point B be defined by intersection of an extension of the slope section 136 and a perpendicular surface passing through the bottom line 135a and perpendicular to the reference plane 111a. Let a point Ai be a foot of a line perpendicular to the slope section 136i and passing through the bottom line 135ai. Let a point Bi be defined by the intersection of an extension of the slope section 136i and a perpendicular surface passing through the bottom line 135ai and perpendicular to the reference plane 111a.

To form the annular lens portions 115 while keeping the bottoms U out of the light passing range X for observation, the partial mold portions 135, 135i, as illustrated in FIGS. 12, are required to have ridge lines 135b, 135bi between the points A and B and the points Ai and Bi. If the ridge lines 135b, 135bi are too close to the points A, Ai, there will be a problem in that a contour of the ridge lines 135b, 135bi emerges in the light passing range for observation. If the ridge lines 135b, 135bi are too close to the point B, Bi, the rise sections 137, 137i will be approximately perpendicular and oriented in the release direction of the Fresnel lens 110. Friction between the drop sections 117 and the rise sections 137, 137i will be high while the Fresnel lens 110 is released from the movable mold 122. The mold release of the Fresnel lens 110 will be difficult. The Fresnel lens 110 will be likely to be deformed or damaged.

It is preferable for the slope sections 136, 136i and the rise sections 137, 137i to satisfy the relationship:

$$0.1 \leq b/L1 \leq 0.9$$

wherein L1 is the distance between the points A and B and points Ai and Bi, and satisfies the relationship:

$$L1 = P \cdot \sin \theta \cdot \tan \cdot$$

wherein $\theta$ is the angle defined between the slope sections 136, 136i and the reference plane 111a;

P is the width of the slope sections 136, 136i in a direction along the reference plane 111a; and b is the distance between the point B and the ridge line 135b, and the point Bi and the ridge line 135bi.

At the partial mold portion 135s having the annular slit 138, a top edge C of the second wall 138b is the highest and similar to the ridge line 135b. Let S be a virtual inclined rise connecting the top edge C and the bottom line 135as lying on the first wall 138a. The virtual inclined rise S corresponds to the rise section 137. It is necessary that the top edge C of the second wall 138b should not have a contour emerging in the light passing range of the observing light. The top edge C is preferably located between the points As and Bs.

However the distance L3 between the points As and Bs depends on the angle θs of the slope section 136s. The smaller the angle θs, the smaller the distance L3. The width W between the first and second walls 138a and 138b should be suitably determined, at the same time as that of the top edge C that lies between the points As and Bs. An experiment was conducted, as a result of which it was observed that the contour of the top edge C of the second wall 138b did not visibly emerge when the contour of the top edge C of the second wall 138b only entered the light passing range X at an entering amount of 0.01 mm or less. It is concluded that the second wall 138b should have:

$$L2 \leq L3 + 0.01 \text{ mm}$$

wherein L2 is the distance between the point Bs and the top edge C of the second wall 138b.

Operation of the above construction is described now. The movable mold support 125 is pressed against, and kept in firm contact with, the stationary mold support 124. Molten transparent resin is poured through the gate 131 into the gap 123 formed inside the mold assembly 120. The resin is injected at a high pressure for filling in a uniform manner. The width of the annular slits 132 and 138 is at most 0.025 mm, thus small enough that no resin enters the annular slits 132 and 138.

The resin filled in the mold assembly 120 is cooled for a predetermined duration and solidified as the Fresnel lens 110, which is removed from the mold assembly 120. The compressed air from the air passageway 133 in the stationary mold support 124 flows through the annular slit 132 and is applied to the Fresnel lens 110. The movable mold support 125 is shifted down with the mold release mechanism 126. The flat surface 112 of the Fresnel leans 110 is easily released from the stationary mold 121 by the force of the compressed air, and is lowered with the movable mold support 125 in contact with the movable mold 122.

The compressed air passing through the air passageway 139 in the movable mold support 125 is applied to the Fresnel surface 111 of the Fresnel lens 110 through the annular slit 138. The drop sections 117 of the annular lens portions 115 are pressed in positions of the annular slit 138, while an air layer is formed between the drop sections 117 and the rise sections 137, 137i. As the annular slit 138 is located to eliminate one rise section, the compressed air is spread to all the drop sections 117 of the annular lens portions 115, which can be pushed with great force. The rise sections 137, 137i and the drop sections 117 are inclined in a direction different from that of releasing the Fresnel leans 110. Therefore there occurs no frictional resistance between the drop sections 117 and the rise sections 137, 137i. The pressing force on the Fresnel lens 110 operates efficiently without being reduced.

The compressed air is let out through the annular slit 138. A layer of the air is gradually spread toward the periphery about the annular slit 138, before the Fresnel leans 110 is released from the movable mold 122. The annular slit 138 is not near to the center 130 or to the periphery of the Fresnel lens 110. The compressed air can be efficiently spread over the whole area of the Fresnel leans 110 so that the impact of the rise sections 137, 137i can be reduced. The Fresnel lens 110 can thus be safely released from the movable mold 122.

At the same time as the compressed air is applied through the annular slit 138, the ejector plate 128 is moved up. The ejector pins 127 are moved to project over the holes 129 toward the Fresnel lens 110. The Fresnel lens 110 can be readily released from the movable mold 122, and also kept away from the movable mold 122 in the higher position. It is thus easy to remove the Fresnel lens 110 from the mold assembly 120. Note that the ejector pins 127 contact peripheral portions of the Fresnel leans 110 around the Fresnel surface 111, and so are prevented from damaging the Fresnel surface 111.

As described above, the Fresnel lens 110 is released from the mold assembly 120 by forming an air layer between the Fresnel lens 110 and the movable mold 122 so that the Fresnel lens 110 floats up from the movable mold 122. Little impact is applied to the Fresnel lens 110, which is thereby prevented from having curvature or damage. The ridge lines 135b, 135bi, 135bj formed on the partial mold portions 135, 135i, 135j are prevented from entering into the light passing range X of the annular lens portions 115. No contour of the ridge lines 135b, 135bi, 135bj visibly lies in the observing light through the Fresnel lens 110. The contour of the top edge C of the second wall 138b only enters the light passing range X by an entering amount of 0.01 mm or less. Therefore, the contour of the top edge C of the second wall 138b does not visibly emerge in the observing light through the Fresnel lens 110.

In the above embodiment, the inclination angle of the rise sections consecutively changes. It is possible to change the angle of the rise sections in a stepwise manner. It is still necessary to incline the rise sections over a range wherein the tops of the slope sections do not enter the light passing range of the observing light. If the pressure of the compressed air exiting from the slit is sufficiently great, it is possible to incline only the rise sections near the slit, without inclining the remaining rise sections of the slope sections, for pressing the Fresnel lens.

The present invention is also applicable to a Fresnel mirror as a Fresnel plate of a light-reflecting type, which includes a reflecting membrane of metal for reflecting light.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A Fresnel plate producing apparatus including stationary and removable molds, in which a Fresnel forming face is formed on one of the said stationary and movable molds, said Fresnel forming face including plural annular slope sections and plural annular rise sections, said annular slope sections and annular rise sections being arranged alternately and concentrically, said Fresnel forming face being adapted to form from resin a Fresnel plate having circular ridges whose summits lie in a reference plane, said Fresnel plate producing apparatus comprising:

a first slit, formed in said Fresnel forming face, for applying compressed air to a formed said Fresnel plate when said Fresnel plate is to be released from said apparatus;

there being a first ridge line disposed between a first of said plural slope sections and a first of said plural rise sections adjacent to said first slope section, said Fresnel forming face projecting at said first ridge line;

said first rise section being formed between said first ridge line and a first bottom line adjacent to said first ridge line, and inclined in reverse to said first slope section;

wherein said first slope section and said first rise section satisfy the relationship:

$$0.1 \leq b/L1 \leq 0.9$$

wherein L1 satisfies the relationship:

$$L1 = P \cdot \sin\theta \cdot \tan\theta$$

wherein θ is the angle defined between said first slope section and said reference plane;
p is the width of said first slope section in a direction along said reference plane; and
b is the distance between a first intersection point and said first ridge line, wherein said first intersection point is by the intersection of an extension of said first slope section and a perpendicular surface passing through said first bottom line and perpendicular to said reference plane.

2. A Fresnel plate producing apparatus as defined in claim 1, wherein said Fresnel forming face provides said Fresnel plate with a concave Fresnel surface constituted by splitting a concave surface of a single optical element into a plurality of annular concave surfaces.

3. A Fresnel plate producing apparatus as defined in claim 2, wherein said Fresnel plate is a Fresnel lens.

4. A Fresnel plate producing apparatus as defined in claim 2, wherein said first slit has an annular shape concentric with said Fresnel forming face.

5. A Fresnel plate producing apparatus as defined in claim 4, wherein the inclination of one said rise section is steeper relative to said reference plane than another of said rise sections that is nearer to the center of said Fresnel forming face than is said one rise section.

6. A Fresnel plate producing apparatus as defined in claim 5, wherein said Fresnel forming face and said first slit are formed by said movable mold.

7. A Fresnel plate producing apparatus as defined in claim 6, further comprising a second slit, formed in said stationary mold and substantially in the center thereof, for applying compressed air to said Fresnel plate when said Fresnel plate is released.

8. A Fresnel plate producing apparatus as defined in claim 4, wherein said first slit is formed between second and third ones of said slope sections, and formed while omitting a second rise section therebetween.

9. A Fresnel plate producing apparatus as defined in claim 8, wherein said first slit has a width of 0.005–0.025 mm.

10. A Fresnel plate producing apparatus as defined in claim 8, wherein there is a second bottom line disposed between said second and third slope sections;
said first slit has first and second walls, said second bottom line lying on said first wall;
said second slope section and said first slit satisfying the relationship:

$$L2 \leq L3 + 0.01 \text{ mm}$$

wherein L3 satisfies the relationship:

$$L3 = P1 \cdot \sin\theta1 \cdot \tan\theta1$$

wherein θ1 is the angle defined between said second slope section and said reference plane;
P1 is the width of said second slope section in said direction along said reference plane; and
L2 is the distance between a second intersection point and said second wall, wherein said second intersection point is the intersection of an extension of said second slope section and a perpendicular surface passing through said second bottom line and perpendicular to said reference plane.

11. A Fresnel plate producing apparatus as defined in claim 4, wherein said Fresnel forming face satisfies the relationship:

$$0.2R \leq r \leq 0.8R$$

wherein R is the radius of the periphery of said Fresnel forming face from the center of said Fresnel forming face; and
r is a radius defined between a middle point inside said first slit and said center of said Fresnel forming face.

* * * * *